July 9, 1935. O. S. FIELD Re. 19,636

RAILWAY TRACK CIRCUITS AND RELAY THEREFOR

Original Filed Dec. 10, 1930

INVENTOR
O. S. Field,
BY Neil W. Preston,
his ATTORNEY

Reissued July 9, 1935 Re. 19,636

UNITED STATES PATENT OFFICE 19,636

RAILWAY TRACK CIRCUITS AND RELAY THEREFOR

Oscar S. Field, Rochester, N. Y., assignor to General Railway Signal Company, Rochester, N. Y.

Original No. 1,942,141, dated January 2, 1934, Serial No. 501,247, December 10, 1930. Application for reissue March 10, 1934, Serial No. 715,021

16 Claims. (Cl. 246—41)

This invention relates in general to relays particularly adapted for use in connection with railway track circuits, and has more particular reference to an arrangement for improving the shunting characteristics in track circuit operation.

In railway operation, in connection with track circuits, it is necessary that track relays should be promptly and certainly deenergized sufficiently by the presence of a train in a block, to cause the relay to release its contact fingers, and to pick up promptly and with certainty upon the block becoming unoccupied.

With the above and other objects in view, it is proposed in accordance with the present invention, to provide a relay arrangement wherein shunting takes place quickly and certainly. More specifically, it is proposed to use a primary relay of very light construction, and having a single contact finger and front point, which is very rapid in its action, and in which the parts have very low inertia, and arrange this primary relay to control a secondary relay having the requisite number of contact fingers and front and back points to perform the various functions desired in connection with the track circuit.

Further objects, purposes and characteristic features of the present invention will appear as the description progresses, reference being made to the accompanying drawing showing, solely by way of example and in no way in a limiting sense, two forms which the invention can assume.

In the drawing:—

Figure 1:
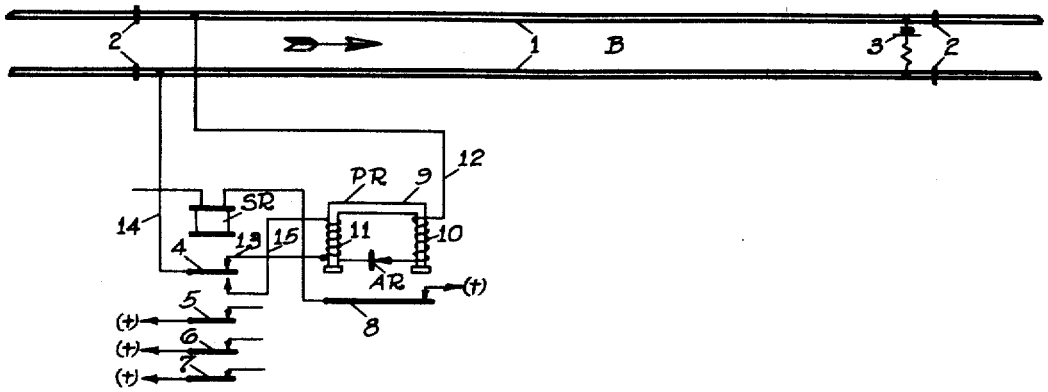
Fig. 1 is a diagrammatic showing of one form of the invention.

Referring now to the drawing, and first to Fig. 1, there is here shown a section of railway track, constituted by track rails 1, separated into insulated blocks by means of insulating joints 2, the block B shown, having a source 3 of electrical energy such as a battery, connected across one end, with a primary relay PR, connected across the other end of the track block and a secondary relay SR associated with this relay RR.

The relay SR is conveniently termed a secondary relay, and has a plurality of contact fingers 4, 5, 6 and 7 for performing various functions as desired.

The relay PR is conveniently termed a primary relay, and has a single contact finger 8, for controlling the energizing circuit of relay SR through contact finger 8 and front point, in a manner obvious from the drawing. Upon release of contact finger 8 of relay PR, relay SR has its energizing circuit opened and immediately releases its contact fingers 4–7 inclusive.

Primary relay PR is a single point relay, as stated above, and is light in construction so that its various parts have low inertia and act very quickly. The core 9 of relay PR carries two windings 10 and 11, with an asymmetric resistance unit AR connected in series between the two windings 10 and 11 as shown. The asymmetric unit AR is of a character to increase its resistance very rapidly as the voltage impressed across it drops below a predetermined low value, and can be constituted by a dry plate copper rectifier, or any other suitable or desired means for accomplishing this end. This unit, as stated, operates to pass current freely when the voltage is above a predetermined value such, for example, as the voltage across the track rails at the relay end, when unshunted, and to offer a very high resistance to passage of current when the voltage across it is below a predetermined value, such, for example, as the voltage across the track rails at the relay end when the block is occupied.

The energizing circuit for relay PR, when the track block is unoccupied, can be traced from one of the track rails 1, wire 12, winding 10, unit AR, wire 13, contact finger 4 and front point of relay SR and wire 14 to the other track rail 1.

Upon the track block being occupied, battery 3 is shunted in the usual manner, to decrease the inter-rail potential at the entrance of battery end of the block, travel being in the direction of the arrow to thereby cause relay PR to release. The decrease of voltage upon occupancy of the track block, brings the voltage across unit AR below the critical value, so that this unit offers a very high resistance, and thus materially aids in the prompt shunting, and resulting release, of primary relay PR.

Release of relay PR, breaks the energizing circuit for relay SR, to cause relay SR to immediately release its contact fingers, since it is then on open circuit.

Upon the track block becoming unoccupied, the inter-rail potential at the entrance end of the block rises to its normal value, which is above the critical value for the unit AR, and picks up relay PR which in turn picks up relay SR. The pick-up circuit for relay PR, also includes the winding 11 of relay PR, this pick-up circuit including wire 12, winding 10, unit AR, winding 11, wire 15 and contact finger 4 and back point of relay SR. This pick-up circuit, it will be noted, includes a greater number of turns than does the holding circuit, traced above, and hence aids in the rapidity and sureness of pick-up of relay PR, upon the block becoming unoccupied.

Figure 2:
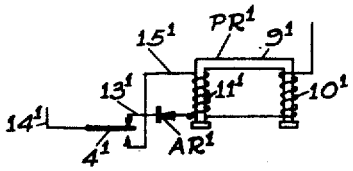
Fig. 2 is a fragmentary view showing a second form of the invention.

In a slightly modified form of the invention, as shown in Fig. 2, the relay PR[1] having windings 10[1] and 11[1], has the asymmetric resistance unit AR[1] inserted in wire 13[1] of the holding circuit for relay PR[1] whereby the resistance unit AR[1] is cut out of the pick-up circuit, and hence decreases the resistance in the pick-up circuit over what it was in the Fig. 1 form and thus improves the pick-up characteristics of the relay.

Thus it is seen, that the above described arrangements provide a quick acting and dependable shunted relay which is quick acting and dependable in picking up when a shunt is removed. The asymmetric unit AR, operated in much the same manner as a ballast lamp, or any other negative temperature coefficient material, with the very important advantage that there is no time lag in connection with the operation of the unit AR, while, with an iron wire, or other thermal element, there is such a time lag as to make it wholly impractical for use in such a connection as described above, since any appreciable time lag would prevent relay PR from holding up, after it had been picked up.

It is, of course, wholly within the purview of this invention, to supply relay SR with any desired number of contact fingers, and to vary the relation between the two windings 10 and 11 of relay PR, and also the relative influences of these two windings as compared to each other and as compared to the asymmetric unit AR.

Furthermore, if desired, the unit AR[1] of Fig. 2 can be shunted around, instead of cut out of the pick-up circuit, in any obvious or usual manner.

It is further contemplated that relay PR can be used alone, equipped with an asymmetric unit for aiding the shunting of the relay being furnished with a plurality of contact fingers to perform various functions, and while the action might not be as fast as that obtained by the combination of relays described, it would be a distinct advantage over the usual track relay, which has no asymmetric resistance unit, acting somewhat similarly to a ballast lamp, in its energizing circuit.

The above rather specific description of two forms of the present invention, is given solely by way of example, and is not intended, in any manner whatsoever, in a limiting sense. Obviously, the invention can assume many different physical forms, and is susceptible of numerous modifications, and all such forms and modifications, as come within the scope of the appended claims, are intended to be included in this application.

Having described my invention, I now claim:—

1. In combination, an insulated section of track, a single point, relatively light, quick acting relay connected across said section, and a plural point, relatively heavy, relay having an energizing circuit controlled by the quick acting relay, and a winding on the quick acting relay, controlled by the plural point relay so as to have a holding circuit for the quick acting relay including a part of said winding, and a pick-up circuit for the quick acting relay including more of said winding.

2. In combination, an insulated section of track, a single point, relatively light, quick acting relay connected across said section, and a plural point, relatively heavy, relay having an energizing circuit controlled by the quick acting relay, a winding on the quick acting relay, including, in series therewith, an asymmetric resistance unit, a holding circuit for the quick acting relay including part of said winding, and a pick-up circuit for the quick acting relay including more of said winding.

3. In combination, an insulated section of track, a single point, relatively light, quick acting relay connected across said section, and a plural point, relatively heavy, relay having an energizing circuit controlled by the quick acting relay, a winding on the quick acting relay, a holding circuit for the quick acting relay including part of said winding, a pick-up circuit for the quick acting relay including more of said winding, and an asymmetric resistance unit included only in said holding circuit.

4. In combination, an insulated section of track, a relatively light, quick acting relay connected across said section, and a plural point, relatively heavy, relay having an energizing circuit controlled by the quick acting relay, and a winding on the quick acting relay, controlled by the plural point relay so as to have a holding circuit for the quick acting relay including a part of said winding, and a pick-up circuit for the quick acting relay including more of said winding.

5. In combination, an insulated section of track, a relatively light, quick acting relay connected across said section, and a plural point, relatively heavy, relay having an energizing circuit controlled by the quick acting relay, a winding on the quick acting relay, including, in series therewith, an asymmetric resistance unit, a holding circuit for the quick acting relay including part of said winding, and a pick-up circuit for the quick acting relay including more of said winding.

6. In combination, an insulated section of track, a relatively light, quick acting relay connected across said section, and a plural point, relatively heavy relay having an energizing circuit controlled by the quick acting relay, a resistance, a winding on the quick acting relay controlled by the plural point relay so as to have a holding circuit for the quick acting relay including a part of said winding and said resistance, and a pick-up circuit for the quick acting relay including more of said winding.

7. In combination, a section of railway track, a source of current connected across the rails of said section, two relays PR and SR, means for connecting the entire winding of relay PR across the rails of said section through a back contact of relay SR, means for connecting only a portion of the winding of relay PR across the rails of said section through a front contact of relays SR, means for energizing relay SR when and only when the armature of relay PR is closed and traffic governing means controlled by relay SR.

8. In combination, a relay, a track circuit including the operating winding of said relay, and means responding to the closing of the armature of said relay to cut a portion of said winding out of said circuit and thereby increase the voltage at which the armature will release.

9. In combination, a relay, a track circuit having two branches the first of which includes the entire operating winding of said relay and the second of which includes a part only of said winding, and means for closing the first or the second of said branches according as the armature of said relay is open or closed.

10. In combination, two relays PR and SR, means for energizing or deenergizing relay SR according as the armature of relay PR is closed or open, a track circuit including the operating winding of relay PR, and means operating when relay SR is energized to cut a portion of the winding of relay PR out of said circuit.

11. In combination, two relays PR and SR, means for energizing or deenergizing relay SR according as the armature of relay PR is closed or open, a track circuit having two branches one of which includes the entire operating winding of relay PR and the other of which includes only a portion of such winding, and means for closing the first or the second of said branches according as relay SR is deenergized or energized.

12. In combination, a primary relay, a secondary relay, means for energizing or deenergizing the secondary relay according as the primary relay assumes its energized or deenergized condition, a track circuit including at times the entire operating winding of said primary relay, and means operating when said secondary relay is energized to exclude a portion of said operating winding from said circuit.

13. In combination, a primary relay, a secondary relay, means for energizing or deenergizing the secondary relay according as the primary relay assumes its energized or deenergized condition, a track circuit including at times the entire operating winding of said primary relay, and means operating when said secondary relay is energized to exclude a portion of said operating winding from said circuit and substitute therefor a noninductive resistance.

14. In combination, a primary relay, a secondary relay, means for energizing or deenergizing the secondary relay according as the primary relay assumes its energized or deenergized condition, a track circuit including at times the entire operating winding of said primary relay, and means operating when said secondary relay is energized to exclude a portion of said operating winding from said circuit and substitute therefor other current limiting means.

15. In a track circuit for railroads, a primary relay, a secondary relay having an energizing circuit opened and closed by a front contact of said primary relay, and contacting means operated by said secondary relay and acting when that relay is de-energized to connect the winding of the primary relay across the track rails, said contacting means also acting when the secondary relay is energized to connect only a part of the winding of the primary relay across the track rails.

16. In a track circuit for railroads, a primary relay, a secondary relay directly controlled by the primary relay to be energized and de-energized as the primary relay is energized and de-energized respectively, and means including a rectifier and contacts operated by said secondary relay for connecting the primary relay across the track rails of the track section, said contacts of the secondary relay acting when that relay is energized to connect a part only of the winding of the primary relay across the track rails and when de-energized the whole of said winding.

OSCAR S. FIELD.